United States Patent
Ehsan et al.

(10) Patent No.: US 8,918,563 B2
(45) Date of Patent: Dec. 23, 2014

(54) UPLINK DATA THROTTLING BY BUFFER STATUS REPORT (BSR) SCALING

(75) Inventors: Navid Ehsan, San Diego, CA (US); Thomas Klingenbrunn, San Diego, CA (US); Shailesh Maheshwari, San Diego, CA (US); Bao Vinh Nguyen, San Diego, CA (US); Gang Andy Xiao, San Diego, CA (US); Jon J. Anderson, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 445 days.

(21) Appl. No.: 13/117,052

(22) Filed: May 26, 2011

(65) Prior Publication Data

US 2011/0296064 A1    Dec. 1, 2011

Related U.S. Application Data

(60) Provisional application No. 61/350,447, filed on Jun. 1, 2010.

(51) Int. Cl.
| | |
|---|---|
| G06F 3/00 | (2006.01) |
| G06F 5/00 | (2006.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/835 | (2013.01) |
| H04L 12/825 | (2013.01) |
| H04W 72/12 | (2009.01) |
| H04L 12/801 | (2013.01) |
| H04L 12/815 | (2013.01) |
| H04W 72/04 | (2009.01) |

(52) U.S. Cl.
CPC ......... *H04L 47/263* (2013.01); *H04W 72/1252* (2013.01); *H04L 47/14* (2013.01); *H04L 47/30* (2013.01); *H04L 47/225* (2013.01); *H04W 72/048* (2013.01)
USPC ................ 710/60; 710/57; 370/236; 370/232

(58) Field of Classification Search
CPC ....... H04L 47/14; H04L 47/263; H04L 47/30; H04W 72/1284; H04W 72/048; H04W 72/0486
USPC ............................... 710/57, 60; 370/232, 236
See application file for complete search history.

(56) References Cited

U.S. PATENT DOCUMENTS

| | | | |
|---|---|---|---|
| 6,891,800 B1 * | 5/2005 | Vollmer et al. | ............... 370/236 |
| 7,787,826 B2 | 8/2010 | Uppala et al. | |

(Continued)

FOREIGN PATENT DOCUMENTS

| | | |
|---|---|---|
| JP | 2005151576 A | 6/2005 |
| JP | 2009105570 A | 5/2009 |

(Continued)

OTHER PUBLICATIONS

International Search Report and Written Opinion—PCT/US2011/038636, ISA/EPO—Sep. 1, 2011.

(Continued)

*Primary Examiner* — Eric Oberly
(74) *Attorney, Agent, or Firm* — Larry Moskowitz

(57) ABSTRACT

A technique for uplink data throttling includes buffer status report (BSR) scaling. A target data flow rate may be determined based on at least on condition of a wireless device. The buffer status report may be adjusted to cause the target flow rate and transmitted by the wireless device. The wireless device may then receive a flow control command based on the buffer status report.

22 Claims, 6 Drawing Sheets

(56) References Cited

U.S. PATENT DOCUMENTS

| | | | |
|---|---|---|---|
| 8,015,306 B2 * | 9/2011 | Bowman | 709/231 |
| 8,019,295 B2 | 9/2011 | Fan | |
| 8,265,640 B2 * | 9/2012 | Meylan et al. | 455/450 |
| 2004/0085940 A1 | 5/2004 | Black et al. | |
| 2005/0078651 A1 * | 4/2005 | Lee et al. | 370/349 |
| 2006/0245352 A1 * | 11/2006 | Kang et al. | 370/229 |
| 2008/0151797 A1 | 6/2008 | Camp | |
| 2009/0092202 A1 * | 4/2009 | Kim et al. | 375/295 |
| 2009/0097444 A1 | 4/2009 | Lohr et al. | |
| 2009/0103479 A1 * | 4/2009 | Goto et al. | 370/328 |
| 2009/0125650 A1 * | 5/2009 | Sebire | 710/57 |
| 2009/0215442 A1 | 8/2009 | Lindoff et al. | |
| 2009/0280798 A1 | 11/2009 | Meylan et al. | |
| 2009/0290625 A1 | 11/2009 | Riddle et al. | |
| 2010/0135166 A1 * | 6/2010 | Ahluwalia | 370/252 |
| 2010/0135229 A1 | 6/2010 | Lohr et al. | |
| 2010/0284314 A1 * | 11/2010 | Pelletier et al. | 370/310 |
| 2010/0302946 A1 * | 12/2010 | Yang et al. | 370/235 |
| 2010/0323743 A1 | 12/2010 | Huan | |
| 2011/0242972 A1 * | 10/2011 | Sebire et al. | 370/229 |
| 2011/0243002 A1 | 10/2011 | Tsuruoka | |
| 2012/0320745 A1 * | 12/2012 | Shi et al. | 370/230 |
| 2013/0039173 A1 | 2/2013 | Ehsan et al. | |

FOREIGN PATENT DOCUMENTS

| | | | | |
|---|---|---|---|---|
| JP | 2011514047 A | | 4/2011 | |
| WO | 2005083955 A1 | | 9/2005 | |
| WO | 2007058178 A1 | | 5/2007 | |
| WO | 2008016774 A2 | | 2/2008 | |
| WO | 2008156198 A2 | | 12/2008 | |
| WO | 2009106490 | * | 2/2009 | H04L 1/00 |
| WO | 2009059995 A1 | | 5/2009 | |
| WO | 2009106490 A1 | | 9/2009 | |

OTHER PUBLICATIONS

International Search Report and Written Opinion—PCT/US2012/050228—ISA/EPO—Sep. 25, 2012.

Samsung: "Description of EUL scheduler", 3GPP Draft; R1-040698 Description of EUL Scheduler, 3rd Generation Partnership Project (3GPP), Mobile Competence Centre; 650, Route Des Lucioles; F-06921 Sophia-Antipolis Cedex; France, vol. RAN WG1, No. Cannes; 20040619, Jun. 19, 2004, XP050112113, [retrieved on Jun. 19, 2004].

* cited by examiner

UPLINK DATA THROTTLING BY BUFFER STATUS REPORT (BSR) SCALING

CROSS-REFERENCE TO RELATED APPLICATION

This application claims the benefit of U.S. Provisional Patent Application No. 61/350,447 entitled "UPLINK DATA THROTTLING BY BUFFER STATUS REPORT (BSR) SCALING" filed on Jun. 1, 2010, the disclosure of which is expressly incorporated herein by reference in its entirety.

BACKGROUND

1. Field

Certain aspects of the present disclosure generally relate to wireless communications.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems and Orthogonal Frequency Division Multiple Access (OFDMA) systems.

SUMMARY

Certain aspects of the present disclosure provide a method of operating a wireless terminal. The method generally includes computing a target data flow based at least in part on an operating temperature of the wireless terminal, determining a buffer status report based on the target data flow and transmitting the buffer status report.

Certain aspects of the present disclosure provide an apparatus for operating a wireless terminal. The apparatus generally includes means for computing a target data flow based at least in part on an operating temperature of the wireless terminal, means for determining a buffer status report based on the target data flow and means for transmitting the buffer status report.

Certain aspects of the present disclosure provide an apparatus for operating a wireless terminal. The apparatus generally includes at least one processor and memory coupled to the at least one processor. The processor(s) is configured to compute a target data flow based at least in part on an operating temperature of the wireless terminal. The processor(s) is further configured to determine a buffer status report based on the target data flow, and to transmit the buffer status report.

Certain aspects of the present disclosure provide a computer-program product for operating a wireless terminal, the computer-program product generally including a computer-readable medium comprising code. The code generally includes code to compute a target data flow based at least in part on an operating temperature of the wireless terminal. The code also includes code to determine a buffer status report based on the target data flow and code to transmit the buffer status report.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
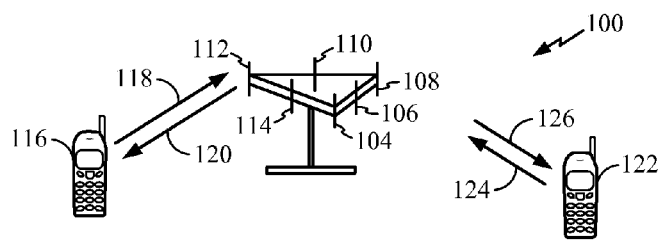
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An evolved NodeB (eNodeB) or access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A User Equipment (UE) or access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a tablet, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a tablet, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An evolved NodeB (eNodeB) 100 may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. UE 116 may be in communication with antennas 112 and 114, where antennas 112 and 114 transmit information to UE 116 over uplink 120 and receive information from UE 116 over down link 118. UE 122 may be in communication with antennas 106 and 108, where antennas 106 and 108 transmit information to UE 122 over uplink 126 and receive information from UE 122 over downlink 124. In a FDD system, communication links 118, 120, 124 and 126 may use different frequency for communication. For example, uplink 120 may use a different frequency then that used by downlink 118.

Each group of antennas and/or the area in which they are designed to communicate is often referred to as a sector of the access point. In one aspect of the present disclosure, each antenna group may be designed to communicate to UEs in a sector of the areas covered by access point 100.

In communication over uplinks 120 and 126, the transmitting antennas of eNodeB 100 may utilize beamforming in order to improve the signal-to-noise ratio of uplinks for the different UEs 116 and 122. Also, an eNodeB using beamforming to transmit to UEs scattered randomly through its coverage causes less interference to UEs in neighboring cells than an eNodeB transmitting through a single antenna to all its UEs.

Figure 2:
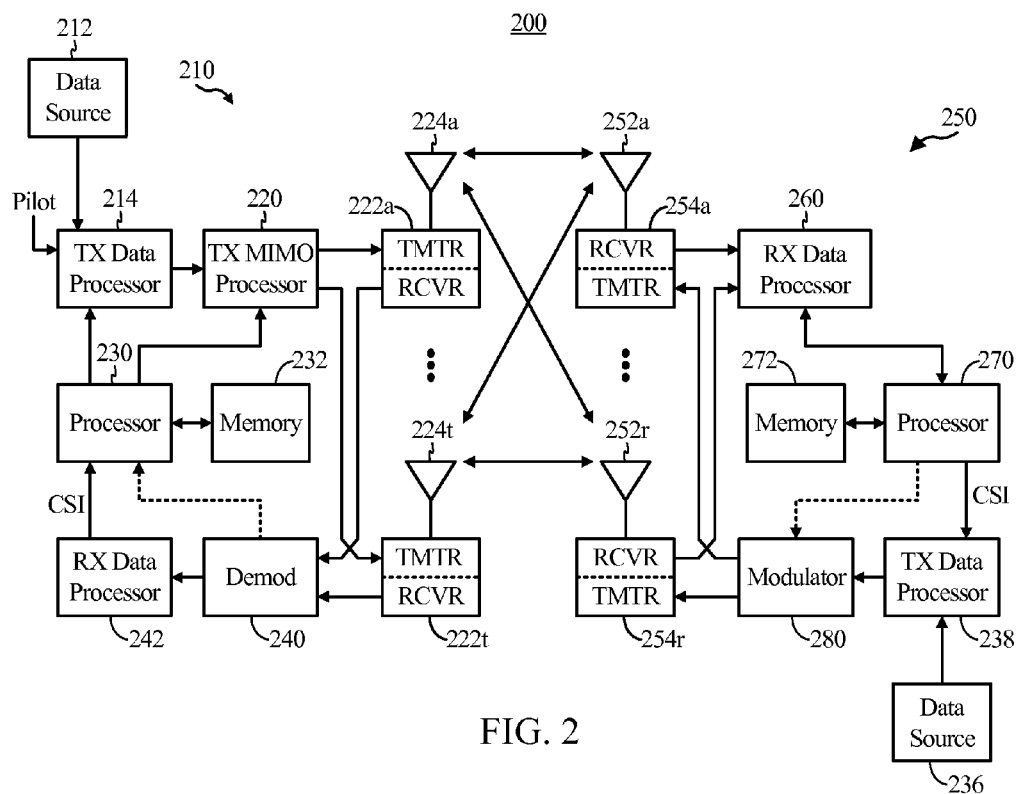
FIG. 2 illustrates a block diagram of an eNodeB and a user terminal in accordance with certain aspects of the present disclosure.

FIG. 2 illustrates a block diagram of an aspect of a transmitter system 210 (also known as the eNodeB) and a receiver system 250 (also known as the UE) in a multiple-input multiple-output (MIMO) system 200. At the transmitter system 210, traffic data for a number of data streams is provided from a data source 212 to transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t.

According to certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a downlink message comprising a matrix index portion and a rank value portion. The downlink message may comprise various types of information regarding the communication link and/or the received data stream. The downlink message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. Processor 230 then determines which pre-coding matrix to use for determining the beamforming weights, and then processes the extracted message.

Figure 3:
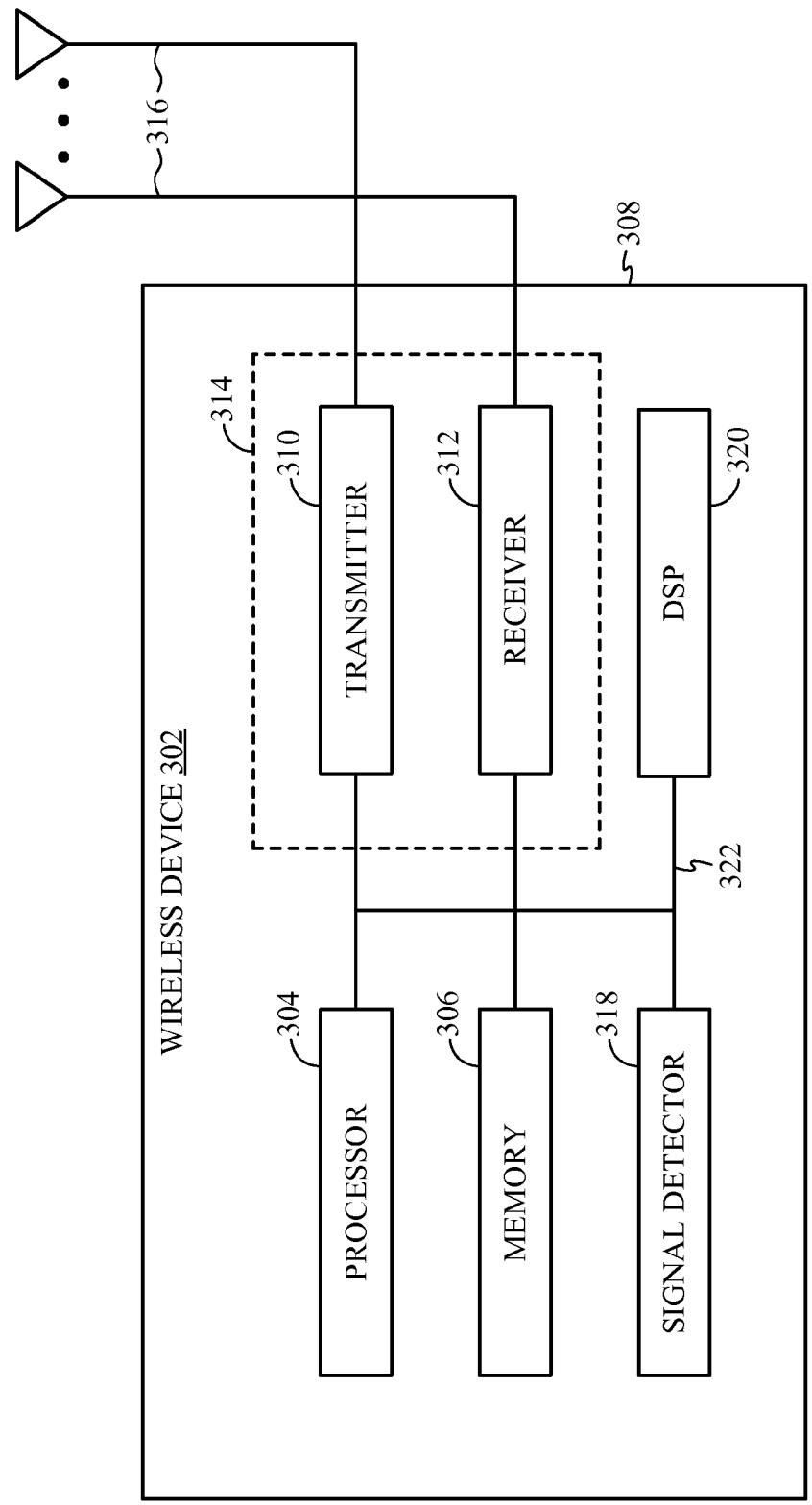
FIG. 3 illustrates various components that may be utilized in a wireless device in accordance with certain aspects of the present disclosure.

FIG. 3 illustrates various components that may be utilized in a wireless device 302 t within the wireless communication system illustrated in FIG. 1. The wireless device 302 is an example of a device that may be configured to implement the various methods described herein. The wireless device 302 may be a base station 100 or any of UEs 116 and 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or multiple transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

For LTE in FDD the transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNodeB may send a Physical HARQ Indicator Channel (PHICH) and a Physical Downlink Control Channel (PDCCH) in the first M symbol periods of each subframe. The PDCCH and PHICH may also be included in the first three symbol periods. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Uplink Data Throttling by Buffer Status Report (BSR) Scaling

New radio access technologies (RATs), such as Long Term Evolution (LTE) may enable data rates above 100 Mbps in the downlink (DL) and over 50 Mbps in the uplink (UL). Such high rates require operating corresponding processors at higher rates, which may cause greater power consumption when compared to traditional devices at lower data rates.

High data rates can cause extreme heat issues, particularly as the devices move towards smaller form factors. It has been seen that in some components such as Power Amplifiers (PAs), operating temperatures may exceed the maximum junction temperature after about 5 minutes of transmitting at a maximum transmit (Tx) power (e.g., 23 dBm).

Power amplifiers are typically the main source of overheating on the uplink. When temperature exceeds a certain threshold, a mobile device may reduce the data rate in order to reduce the temperature. For example, the "touch" temperature of a device is predicted to lie between 42° C. and 51° C. with the uplink limit for a plastic housing set at 50° C.

These factors may make it desirable to carefully monitor device temperatures and ensure that situations do not arise where the device is damaged or the customer experiences uncomfortably high touch temperatures. In such conditions, the desired behavior would be to reduce the downlink and/or uplink transmit power and/or data rates in order to reduce the temperature.

Because in most cases the overheating is due to a power amplifier operating at full power, it is desirable to have an efficient way of throttling (reducing) the uplink data when the power amplifier is hot. Unfortunately, there is no standard method in LTE to throttle the uplink data.

As an example, in HSPA the uplink flow control is done by decreasing the Radio Link Control-Automatic Repeat Request (RLC ARQ) window-size. The window-size has a direct relationship with the maximum achievable data rate:

$$\text{Data\_rate} = \frac{1}{2} * (\text{window\_size} * RLC\_PDU\_size)/RTT$$
(Round Trip Time)

In LTE, due to varying radio link control PDU (Protocol Data Unit) size, reducing the window-size does not help in reducing the data rate. According to certain aspects, an approach may involve adjusting the Buffer Status Report (BSR) in order to achieve the desired data rate.

In certain aspects, to control an uplink (UL) data flow (e.g., in LTE), flow control commands may be received from a Central Flow Control Manager (CFM) or directly from a temperature monitor within a user equipment (UE). Based on the commands received from the CFM or the temperature monitor, an uplink flow control component within the UE may first determine a target flow rate and then adjust parameters in order to achieve the desired uplink flow rate.

Figure 4:
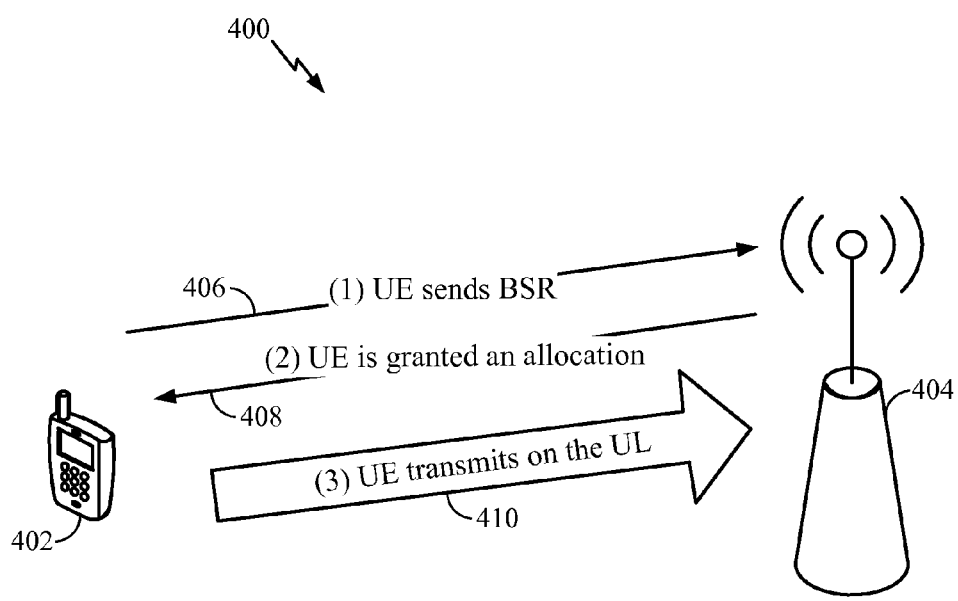
FIG. 4 illustrates an example wireless communication system employing dynamic uplink scheduling in accordance with certain aspects of the present disclosure.

FIG. 4 illustrates an example wireless communication system 400 employing dynamic uplink scheduling in accordance with certain aspects of the present disclosure. A user equipment (UE) 402 wirelessly communicates with a base station (or eNodeB) 404. A Buffer Status Report (BSR) is used by the base station to allocate appropriate resources (in the form of resource blocks) in the uplink for the UE to transmit its data. This method is used for dynamic scheduling and is generally not applicable to semi-persistent scheduling. The UE 402 transmits, at time 406, the buffer status report to the base station 404. In response to receiving the buffer status report, the base station 404 transmits, at time 408, an uplink resource allocation back to the UE 402. The UE 402 may transmit data, at time 410, on the uplink channel based on the uplink resource allocation.

In certain aspects, the method to control uplink data flow described may be based on adjusting the buffer status reports sent by the UE 402. The UE may advertise a small buffer at any given moment in order to achieve a desired data rate. Note that while this mechanism may successfully control the over the air data rate, it may not have an immediate effect on the higher layer Transmission Control Protocol/User Datagram Protocol (TCP/UDP) rates. If higher layers have a congestion control mechanism in place, they may slow down as a response to an increase in delay, otherwise the packets will simply be dropped due to buffer overflow.

Figure 5:
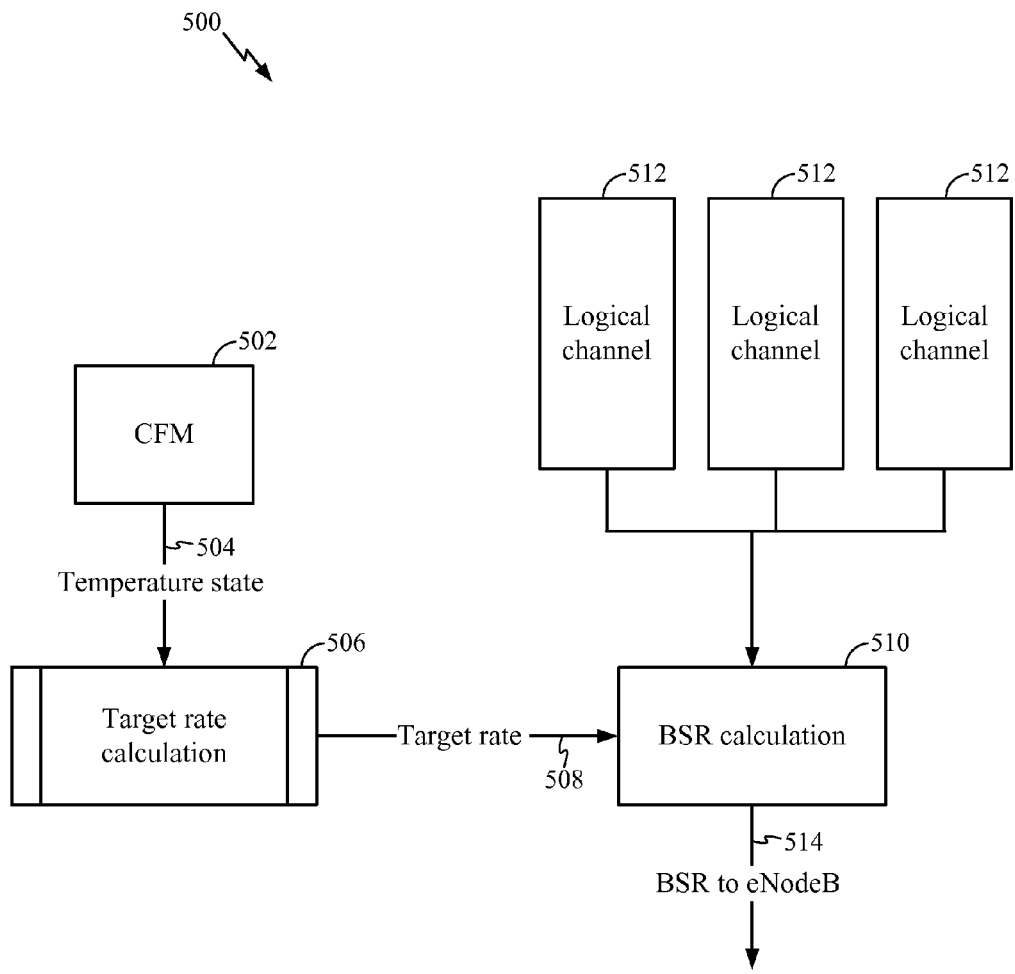
FIG. 5 illustrates an example of a high-level architecture for dynamic uplink scheduling in accordance with certain aspects of the present disclosure.

FIG. 5 illustrates an example of a high level architecture 500 for uplink throttling in accordance with certain aspects of the present disclosure. A central flow control manager 502 senses the operating temperature of at least one component in a UE (or the operating temperature of the UE itself) and sends a temperature state 504 to a target rate calculation unit 506. Target rate calculation unit 506 calculates a target flow rate 508 based on the temperature state received from the central flow control manager 502 and sends the calculated target flow rate 508 to a buffer status report calculation unit 510. The buffer status report calculation unit 510 computes a new buffer status report based on the target flow rate 508 and transmits the new BSR 514 to an eNodeB. In certain aspects, Radio Resource Control (RRC) messaging controls buffer status report reporting by configuring two timers, periodicBSR-Timer and retxBSR-Timer. For each logical channel, RRC messaging optionally signals Logical Channel Group (LCG) 512 which allocates the logical channel to a logical channel group. In certain aspects, the buffer status report can be sent for each logical channel group as configured by an eNodeB.

Figure 6:
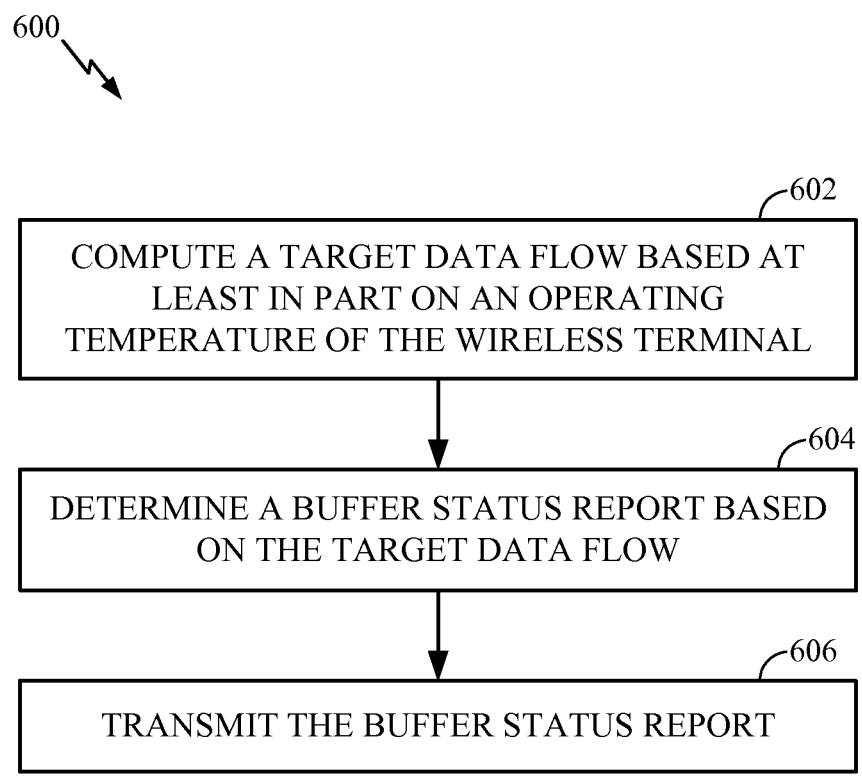
FIG. 6 illustrates example operations that may be performed by a user equipment (UE) in accordance with certain aspects of the present disclosure.

FIG. 6 illustrates example operations 600 that may be performed by a user equipment in accordance with certain aspects of the present disclosure. At block 602, a target data flow is computed based at least in part on an operating temperature of the wireless terminal. At block 604, a buffer status report (BSR) is determined based on the target data flow. At block 606, the buffer status report (BSR) is transmitted.

Target Flow Rate Calculation

According to certain aspects, there may be different states associated with monitored temperature. As an example, there may be three temperature states 504 for the temperature monitor: Normal, mitigation, and emergency. In the normal state, there is no data throttling and the buffer status report may operate in a conventional manner (e.g., as described in the 3GPP standard TS 36.321). In the mitigation state, the flow rate is gradually decreased in order to reduce the temperature. If the temperature reaches the emergency state, all data communication from the UE to the base station are terminated. In certain aspects, multiple temperature states are defined for the uplink flow control method and each state corresponds to a particular data rate range. The dynamics of the state change is out of the scope of this disclosure. An example of such a flow control method used to calculate the target flow rate is explained below.

Target Flow Rate Method

A target flow rate method may determine a flow control state based on flow control commands received from the central flow control manager (CFM) and the expiration of a configurable step timer. In certain aspects, commands are received from a temperature monitor or other monitor. In one aspect, a DOWN command may be received, in mitigation state, an OFF may be received in a normal state, and a SHUT DOWN command may be received in emergency state. An initial setting for a flow control may be the flow control OFF (FC OFF) state, for example.

According to aspects of the present disclosure, there can be N+1 flow control states. The FC OFF state occurs before flow control is triggered. The other N states each correspond to a particular data rate. For example, state 0 may correspond to the highest data rate. According to one aspect of the disclosure, effectively no flow control is applied in either state 0 or FC OFF state, however these two states are not identical. For example, if the flow control state is in an FC OFF state when a DOWN command is received, the flow control state transitions to a default state. If the flow control state is in a state 0 when a DOWN command is received, the flow control state transitions to state 1. These different state transitions allow the flow control state to oscillate between state 0 and 1, which may be desirable if a selected operating point is between these two points, rather than changing the flow control state to the default state every time.

In certain aspects, the flow control state may be derived from certain events including receiving an UP command from the central flow control manager (event: UP) or a receiving a DOWN command received from the central flow control manager (event: DOWN). The flow control state may also be derived from expiration of a step timer when the last command received from central flow control manager was UP or when the last command received from central flow control manager was DOWN.

Buffer Status Report (BSR) Adjustment

In order to control the uplink throughput according to aspects of the present disclosure, a UE adjusts the buffer status report (BSR). A method of generating a BSR for flow control according to aspects of the present disclosure includes receiving a target data rate as an input and adjusting the buffer status report to converge to the target data rate. Transmission time intervals (TTIs) are divided into two categories: transmit period TTIs and a cool down period TTIs in which the length of cool down period T is configurable.

According to aspects of the present disclosure, a UE may generate a BSR to achieving a target data rate R. In one example, a UE may start a transmit period by sending an Initial Request (IR) indicating the cool down period multiplied by the target data rate, i.e., $IR=T_c \times R$.

After the Initial Request, the UE updates a "fake buffer size." The fake buffer size $B_t$ (in bytes) is determined as follows:

$$B_t = B_{t-1} - G_{t-1} + (R \times TTI).  \quad\quad \text{[Equation 1]}.$$

The fake buffer size corresponds to the BSR value at time t if a BSR is triggered. In this example, $G_t$ (in bytes) is the uplink grant size at time t, R is the target data rate (bytes per second), and TTI is 1 msec.

If the UE transmits a BSR during an active time, the value will be equal to the value of "fake buffer size" at that time. The "cool down period" starts as soon as the fake buffer becomes empty. According to aspects of the disclosure, if a BSR is triggered during the cool down period, for reasons including data arrival or time to transmit a periodic BSR, for example, the UE advertises a BSR value of zero. If the UE receives any uplink grants during the cool down period, the UE sends the BSR with a zero value and pads the remainder of the grant. The UE should not send any application data on the uplink during the cool down period.

Figure 7:
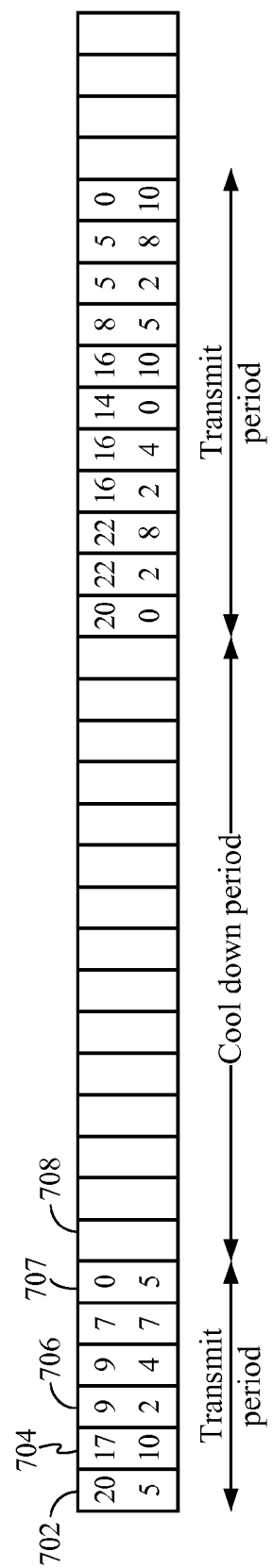
FIG. 7 illustrates example operations that may be performed by a user equipment (UE) for adjusting a buffer status report (BSR) in accordance with certain aspects of the present disclosure.

An example of BSR adjustment according to aspects of the present disclosure is described with reference to FIG. 7. In this example, the Initial Request, IR is 20 bytes and the "R×TTI" value is 2 bytes. Each TTI in a transmit period is shown as a box with two numbers in which the top number represents size of a fake MAC buffer and the bottom number represents a value of the uplink grant in the transmit period. Each TTI corresponding to a cool down period is shown as an empty box. In a first TTI 702, the top number indicates that Initial Request IR=20 bytes and the bottom number indicates that the UE has been granted 5 bytes on the uplink. In a second TTI 704, the value for the fake MAC buffer is 20−5+2=17 using Equation 1. In the second TTI 704, the UE has been granted 10 bytes on the uplink. In a third TTI 706, the fake MAC buffer is 17−10+2=9. In the third TTI 706, the UE has been granted two bytes in the uplink. At the sixth TTI 707, the fake buffer becomes empty. Thus, the cool down period begins at the seventh TTI 708.

It may be appreciated that although the method is discussed in terms of uplink throttling in an effort to control overheating, the methods described may apply to data throttling resulting from a central processing unit (CPU) or memory overload.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in the Figures, those operations may have corresponding counterpart means-plus-function components with similar numbering.

In one configuration, a mobile device is configured for wireless communication including means for determining a target data flow rate based on at least one condition; and means for adjusting a buffer status report (BSR) to cause the target data flow rate. In one aspect, the aforementioned means may be a processor 230 and a memory 232. In another aspect, the aforementioned means may be a module or any apparatus configured to perform the functions recited by the aforementioned means.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of operating a wireless terminal, the method comprising:
   receiving a flow control command corresponding to at least one of a central processing unit (CPU) overload, and a temperature greater than a predetermined threshold;
   computing a target data flow rate corresponding to the flow control command;
   receiving the computed target data flow rate as an input;
   inputting the computed target data flow rate into a calculation that outputs a buffer size when a buffer status report (BSR) is triggered;

generating the BSR indicating the calculated buffer size; and transmitting the BSR to cause the computed target data flow rate.

2. The method of claim 1, in which computing the target data flow rate is further based on a memory overload.

3. The method of claim 1, in which the flow control command comprises state information indicating a state selected as a function of the operating temperature of the wireless terminal.

4. The method of claim 3, further comprising:
determining a final state of a flow control flag based on the flow control command and an initial state of the flow control flag.

5. The method of claim 4, in which adjusting the buffer status report comprises determining the buffer status report based on the target data flow rate and the final state of the flow control flag.

6. The method of claim 1, in which the buffer size is a buffer size of active logical channel groups.

7. An apparatus for operating a wireless terminal, the apparatus comprising:
means for receiving a flow control command corresponding to at least one of a central processing unit (CPU) overload, and a temperature greater than a predetermined threshold;
means for computing a target data flow rate corresponding to the flow control command;
means for receiving the computed target data flow rate as an input;
means for inputting the computed target data flow rate into a calculation that outputs a buffer size when a buffer status report (BSR) is triggered;
means for generating a the BSR indicating the calculated buffer size; and
means for transmitting the BSR to cause the computed target data flow rate.

8. The apparatus of claim 7, in which computing the target data flow rate is further based on a memory overload.

9. The apparatus of claim 7, in which the flow control command comprises state information indicating a state selected as a function of the operating temperature of the wireless terminal.

10. The apparatus of claim 9, further comprising:
means for determining a final state of a flow control flag based on the flow control command and an initial state of the flow control flag.

11. The apparatus of claim 10, in which the means for generating the buffer status report comprises means for determining the buffer status report based on the target data flow rate and the final state of the flow control flag.

12. The apparatus of claim 7, in which the buffer size is a buffer size of active logical channel groups.

13. An apparatus for operating a wireless terminal, the apparatus comprising:
a memory;
at least one processor coupled to the memory and configured:
to receive a flow control command corresponding to at least one of a central processing unit (CPU) overload, and a temperature greater than a predetermined threshold;
to compute a target data flow rate corresponding to the flow control command;
to receive the computed target data flow rate as an input;
to input the computed target data flow rate into a calculation that outputs a buffer size when a buffer status report (BSR) is triggered;
to generate the BSR indicating the calculated buffer size; and
to transmit the BSR to cause the computed target data flow rate.

14. The apparatus of claim 13, in which computing the target data flow rate is further based on a memory overload.

15. The apparatus of claim 13, in which the flow control command comprises state information indicating a state selected as a function of the operating temperature of the wireless terminal.

16. The apparatus of claim 15, in which the processor is further configured to determine a final state of a flow control flag based on the flow control command and an initial state of the flow control flag.

17. The apparatus of claim 16, in which the processor is further configured to generate the buffer status report based on the target data flow rate and the final state of the flow control flag.

18. The apparatus of claim 13, wherein the buffer size is a buffer size of active logical channel groups.

19. A computer-program product for operating a wireless terminal, the computer-program product comprising:
a non-transitory computer-readable medium comprising:
code to receive a flow control command corresponding to at least one of a central processing unit (CPU) overload, and a temperature greater than a predetermined threshold;
code to compute a target data flow rate corresponding to the flow control command;
code to receive the computed target data flow rate as an input;
code to input the computed target data flow rate into a calculation that outputs a buffer size when a buffer status report (BSR) is triggered;
code to generate the BSR indicating the calculated buffer size; and
code to transmit the BSR to cause the computed target data flow rate.

20. The method of claim 1, in which computing the target data flow rate is further based on a coexistence issue.

21. The apparatus of claim 7, in which computing the target data flow rate is further based on a coexistence issue.

22. The apparatus of claim 13, in which computing the target data flow rate further based on a coexistence issue.

* * * * *